United States Patent
Deguchi et al.

(10) Patent No.: US 10,835,892 B2
(45) Date of Patent: Nov. 17, 2020

(54) $CO_2$ DESORPTION CATALYST

(71) Applicant: THE KANSAI ELECTRIC POWER CO., INC., Osaka (JP)

(72) Inventors: Hiroshi Deguchi, Amagasaki (JP); Tsunenori Watanabe, Amagasaki (JP); Yasuyuki Yagi, Amagasaki (JP)

(73) Assignee: THE KANSAI ELECTRIC POWER CO., INC., Osaka (JP)

( * ) Notice: Subject to any disclaimer, the term of this patent is extended or adjusted under 35 U.S.C. 154(b) by 348 days.

(21) Appl. No.: 15/852,886

(22) Filed: Dec. 22, 2017

(65) Prior Publication Data

US 2018/0117571 A1 May 3, 2018

Related U.S. Application Data

(62) Division of application No. 14/356,074, filed as application No. PCT/JP2012/080340 on Nov. 22, 2012, now abandoned.

(30) Foreign Application Priority Data

Nov. 29, 2011 (JP) .................... 2011-260742

(51) Int. Cl.
*B01J 29/06* (2006.01)
*B01J 23/44* (2006.01)
(Continued)

(52) U.S. Cl.
CPC .......... *B01J 29/06* (2013.01); *B01D 53/1425* (2013.01); *B01D 53/1475* (2013.01);
(Continued)

(58) Field of Classification Search
CPC .................................................. B01J 29/06
See application file for complete search history.

(56) References Cited

U.S. PATENT DOCUMENTS 3,851,041 A * 11/1974 Eickmeyer ......... B01D 53/1406
423/223
6,221,805 B1 4/2001 Yamashita et al.
(Continued)

FOREIGN PATENT DOCUMENTS

JP 3-193116 A 8/1991
JP 8-173748 A 7/1996
(Continued)

OTHER PUBLICATIONS

International Search Report dated Jan. 15, 2013 issued in corresponding application No. PCT/JP2012/080340.
(Continued)

*Primary Examiner* — Aileen B Felton
(74) *Attorney, Agent, or Firm* — Westerman, Hattori, Daniels & Adrian, LLP

(57) ABSTRACT

This invention provides a $CO_2$ desorption catalyst that has an excellent $CO_2$ desorption activity and that can be used to replace metal filler. This invention provides a $CO_2$ desorption catalyst comprising an inorganic powder or inorganic powder compact, the inorganic powder or inorganic powder compact having a BET specific surface area of 7 $m^2/g$ or more.

4 Claims, 1 Drawing Sheet

(51) Int. Cl.

| | | |
|---|---|---|
| *B01J 23/50* | (2006.01) | |
| *B01J 23/745* | (2006.01) | |
| *B01J 23/75* | (2006.01) | |
| *B01J 23/755* | (2006.01) | |
| *B01J 29/068* | (2006.01) | |
| *B01J 29/072* | (2006.01) | |
| *B01D 53/14* | (2006.01) | |
| *B01D 53/96* | (2006.01) | |
| *B01J 21/04* | (2006.01) | |
| *B01J 23/26* | (2006.01) | |
| *B01J 23/80* | (2006.01) | |
| *B01J 27/24* | (2006.01) | |

(52) U.S. Cl.
CPC .............. *B01D 53/96* (2013.01); *B01J 21/04* (2013.01); *B01J 23/26* (2013.01); *B01J 23/44* (2013.01); *B01J 23/50* (2013.01); *B01J 23/745* (2013.01); *B01J 23/75* (2013.01); *B01J 23/755* (2013.01); *B01J 23/80* (2013.01); *B01J 27/24* (2013.01); *B01J 29/061* (2013.01); *B01J 29/068* (2013.01); *B01J 29/072* (2013.01); *B01D 2252/20478* (2013.01); *B01D 2255/104* (2013.01); *B01D 2255/1021* (2013.01); *B01D 2255/1023* (2013.01); *B01D 2255/2092* (2013.01); *B01D 2255/20738* (2013.01); *B01D 2255/20746* (2013.01); *B01D 2255/20753* (2013.01); *B01D 2255/30* (2013.01); *B01D 2255/9207* (2013.01); *B01D 2257/504* (2013.01); *B01J 2229/42* (2013.01); *Y02C 20/40* (2020.08); *Y10T 428/2982* (2015.01)

(56) References Cited

U.S. PATENT DOCUMENTS

| | | | |
|---|---|---|---|
| 2003/0136708 A1* | 7/2003 | Crane | ............... B01J 21/04 |
| | | | 208/137 |
| 2009/0155889 A1 | 6/2009 | Handagama et al. | |
| 2009/0238742 A1 | 9/2009 | Liu et al. | |

FOREIGN PATENT DOCUMENTS

| | | | |
|---|---|---|---|
| JP | 2004-244265 A | 9/2004 | |
| JP | 2006-523690 A | 10/2006 | |
| JP | 2007-314745 A | 12/2007 | |
| JP | 2010-195616 A | 9/2010 | |
| WO | 2004-078711 A2 | 9/2004 | |
| WO | 2011/120138 A1 | 10/2011 | |
| WO | 2012/119715 A1 | 9/2012 | |

OTHER PUBLICATIONS

Extended European Search Report dated May 26, 2015, , issued in counterpart European Patent Application No. 12854005.1 (7 pages).

* cited by examiner

$CO_2$ DESORPTION CATALYST

CROSS-REFERENCE TO RELATED APPLICATIONS

This is a divisional of U.S. application Ser. No. 14/356,074 filed on May 2, 2014, which is a 371 of PCT/JP2012/080340 filed on Nov. 22, 2012, which claims priority over Japanese Application No. 2011-260742 filed on Nov. 29, 2011, the entire contents of which is incorporated herein by reference.

TECHNICAL FIELD

This invention relates to a $CO_2$ desorption catalyst.

BACKGROUND ART

Chemical absorption methods are widely known as a method for removing and collecting $CO_2$ from combustion exhaust gas from thermal power stations and steel works (PTL 1). In a chemical absorption method, $CO_2$ is brought into contact with an aqueous solution mainly containing alkanolamine (hereinafter also referred to as an "absorbing solution") in an absorption tower, so as to allow the $CO_2$ to be absorbed into the absorbing solution. The absorbing solution containing the absorbed $CO_2$ is transferred to a regeneration tower where the transferred solution is heated by heating vapor to cause the absorbed $CO_2$ to be desorbed (degassed). The desorbed $CO_2$ is collected, and the absorbing solution from which the $CO_2$ has been desorbed is transferred back to the absorption tower to be reused.

Heretofore, the regeneration tower is filled with metal filler, such as thin stainless-steel plates or mesh balls obtained by wadding stainless steel mesh. The contact area of the absorbing solution and heating vapor is increased by allowing the absorbing solution to move through the surface of the filler. In this manner, desorption of $CO_2$ is promoted.

CITATION LIST

Patent Literature

PTL 1: JPH03-193116A

SUMMARY OF INVENTION

Technical Problem

However, the metal filler heretofore used exerts limited activity on the promotion of desorption. Further, the filler heretofore used generally occupies a large volume of space, and the regeneration tower must therefore be made larger to achieve the desired desorption amount.

For this reason, the development of $CO_2$ desorption catalysts that have an excellent $CO_2$ desorption activity and that can be used to replace the metal filler is in demand.

An object of the invention is to provide a $CO_2$ desorption catalyst having excellent $CO_2$ desorption activity.

Solution to Problem

As a result of extensive research, the present inventors found that the use of a specific inorganic powder or inorganic powder compact makes it possible to provide the above $CO_2$ desorption catalyst having excellent $CO_2$ desorption activity. The invention has thereby been accomplished.

Specifically, as described below, the invention relates to a $CO_2$ desorption catalyst, a $CO_2$ desorption device having this catalyst, and a method for desorbing $CO_2$ by using this catalyst.

1. A $CO_2$ desorption catalyst comprising an inorganic powder or inorganic powder compact,
   the inorganic powder or inorganic powder compact having a BET specific surface area of 7 $m^2/g$ or more.
2. The $CO_2$ desorption catalyst according to Item 1, wherein the inorganic powder or inorganic powder compact is at least one member selected from the group consisting of BN, metal oxides, metals, and clay minerals.
3. The $CO_2$ desorption catalyst according to Item 1 or 2, wherein the inorganic powder or inorganic powder compact is at least one member selected from the group consisting of BN, $Ga_2O_3$, $Al_2O_3$, $SiO_2$, CuO, ZnO, Pd, Fe, Co, Ag, Ni, Pt, Cr, and zeolites.
4. The $CO_2$ desorption catalyst according to one of Items 1 to 3, wherein the inorganic powder or inorganic powder compact is at least one member selected from the group consisting of BN, $Ga_2O_3$, $Al_2O_3$, Pd, Fe, and zeolites.
5. The $CO_2$ desorption catalyst according to one of Items 1 to 4, wherein the inorganic powder or inorganic powder compact is at least one member selected from the group consisting of BN and $Al_2O_3$.
6. The $CO_2$ desorption catalyst according to Item 5, wherein at least one metal selected from the group consisting of Pd, Fe, Co, Ag, Ni, and Pt is supported on the catalyst.
7. A $CO_2$ desorption device including:
   a $CO_2$ absorption tower for absorbing and removing $CO_2$ from exhaust gas by using an absorbing solution; and
   a regeneration tower for regenerating the absorbing solution containing absorbed $CO_2$,
   wherein the regeneration tower contains the $CO_2$ desorption catalyst of any one of Items 1 to 6.
8. A method for desorbing $CO_2$,
   the method comprising the step of regenerating an absorbing solution containing absorbed $CO_2$,
   wherein the regeneration step brings the absorbing solution containing absorbed $CO_2$ into contact with the $CO_2$ desorption catalyst of any one of Items 1 to 6.
9. Use of an inorganic powder or inorganic powder compact having a BET specific surface area of 7 $m^2/g$ or more, as a catalyst for desorbing $CO_2$.
10. A method for using an inorganic powder or inorganic powder compact having a BET specific surface area of 7 $m^2/g$ or more, as a catalyst for desorbing $CO_2$.

The $CO_2$ desorption catalyst of the invention is described below in detail. The invention also encompasses the use of an inorganic powder or inorganic powder compact having a BET specific surface area of 7 $m^2/g$ or more, as a catalyst for desorbing $CO_2$ from a $CO_2$-containing solution. The invention further encompasses a method for using an inorganic powder or inorganic powder compact having a BET specific surface area of 7 $m^2/g$ or more, as a catalyst for desorbing $CO_2$ from a $CO_2$-containing solution.

$CO_2$ Desorption Catalyst of the Invention

The $CO_2$ desorption catalyst of the invention (hereinafter sometimes simply referred to as "the catalyst of the invention") comprises an inorganic powder or inorganic powder compact having a BET specific surface area of 7 $m^2/g$ or more. Since the inorganic powder or inorganic powder compact has a BET specific surface area of 7 $m^2/g$ or more, the $CO_2$ desorption catalyst has an excellent activity to desorb $CO_2$ from a $CO_2$-containing absorbing solution. A BET specific surface area is a value obtained by dividing an inorganic powder surface area including the contribution of microscopic unevenness, pores, etc., by the mass of the inorganic powder. A molecule whose adsorption area has been calculated is allowed to adsorb onto the surface of an inorganic powder at a liquid nitrogen temperature, and based on the adsorbed amount, the BET surface area can be calculated. The upper limit of the BET specific surface area is preferably 500 $m^2/g$ or less.

The inorganic powder or inorganic powder compact has a BET specific surface area of more preferably 50 to 400 $m^2/g$, and still more preferably 60 to 250 $m^2/g$, in view of the catalytic effect and strength thereof.

The BET specific surface area of the inorganic powder or inorganic powder compact can be obtained by measuring the BET specific surface area of the inorganic powder. When the inorganic powder has a BET specific surface area of 7 $m^2/g$ or more, the inorganic powder compact also has a BET specific surface area of 7 $m^2/g$ or more.

The BET specific surface area of the inorganic powder can be measured using a commercially available measuring instrument. Examples of an instrument for measuring the BET specific surface area include the NOVA-4200e, produced by Quantachrome, and the like.

The components of the catalyst of the invention (inorganic powder or inorganic powder compact) are not limited as long as they are inorganic components. For example, any inorganic components can be used, such as boron nitride (BN), metal oxides, metal nitrides, metal carbides, metal borides, metals (simple substances), intermetallic compounds, and clay minerals. In the catalyst of the invention, inorganic powders or inorganic powder compacts may be used singly or in a combination of two or more. When two or more types of inorganic powders or inorganic powder compacts are combined for use, the inorganic powders or inorganic powder compacts may be simply mixed, or may be in the form of a solid solution. For example, a solid solution of a plurality of metal oxides may be used as a composite metal oxide.

Examples of metal oxides include $Al_2O_3$, $SiO_2$, $TiO_2$, $Cr_2O_3$, MgO, $Ga_2O_3$, CuO, ZnO, and the like. Examples of composite metal oxides include $Al_2O_3$—$Ga_2O_3$, CuO—ZnO, $Al_2O_3$—$SiO_2$, and $SiO_2$—$TiO_2$; and Sr- and Mg-doped lanthanum gallate (LSGM), and Co-doped LSGM (LSGMC), and the like.

Examples of metal nitrides include AlN, SiN, TiN, and the like.

Examples of metal carbides include SiC, TiC, $MgC_2$, and the like.

Examples of metal borides include $Co_2B$, $Fe_2B$, $Ni_2B$, PtB, $RuB_2$, and the like.

Examples of metals (simple substances) include Pd, Fe, Co, Ni, Cu, Ru, Ag, Au, Pt, Cr, and the like.

Examples of intermetallic compounds include AlFe, $CoPt_3$, CoFe, RuTi, and the like.

Examples of clay minerals include zeolites, talcs, sepiolites, kaolinites, montmorillonites, and the like.

The catalyst of the invention is preferably at least one member selected from the group consisting of BN, $Ga_2O_3$, $Al_2O_3$, Pd, Fe, and zeolites.

As the catalyst of the invention, an inorganic powder or inorganic powder compact in which metal is supported on a component mentioned above may be used. As the metal supported on the component, the same metals given above as examples of metals (Pd, Fe, Co, Ni, Cu, Ru, Ag, Au, Pt, Cr, and the like) may be used. For example, when $Al_2O_3$ is used as the catalyst of the invention, at least one member selected from the group consisting of Pd, Fe, Co, Ag, and Ni (in particular, preferably at least one member selected from the group consisting of Pd, Fe, and Ag) is supported on the $Al_2O_3$. In this manner, the $CO_2$ desorption activity can be improved.

When metal is supported, the loading of the supported metal is preferably 0.1 to 10 wt %, based on the entire catalyst of the invention.

The metal supported on the $CO_2$ desorption catalyst is in many cases in the so-called oxidation state immediately after the preparation. In this case, a reduction treatment may be performed in advance so that the metal in the oxidation state is reduced to the metal state. The catalytic activity of the $CO_2$ desorption catalyst is thereby further enhanced.

The reduction treatment may be performed, for example, by heat treatment in gas such as $H_2$ or $H_2$—$N_2$. The heat treatment is performed at a temperature of preferably 200 to 400° C. The duration of the heat treatment is preferably about 30 minutes to 5 hours.

The shape of the inorganic powder is not particularly limited. Examples include a spherical shape, a granular shape, an unfixed shape, a branched shape, a needle shape, a rod shape, a flat shape, and the like.

The size of the inorganic powder is not particularly limited. When the inorganic powder is in the shape of a sphere, the diameter is preferably about 0.01 to 10 µm.

A compact obtained by shaping the inorganic powder (an inorganic powder compact) can also be used as the catalyst of the invention. The shape of this compact is not particularly limited. Examples include a spherical shape, a columnar shape, a disk shape, a ring shape, a coating film shape, and the like.

The size of the inorganic powder compact is not particularly limited. When the compact is in the shape of a disk, the diameter is preferably about 1 to 100 mm.

The method for producing the inorganic powder compact is not particularly limited. For example, an inorganic powder that can be used in this invention is shaped by a tableting machine, an extruder, or the like.

When the inorganic powder compact is in the shape of a coating film, the film thickness is preferably about 0.1 to 0.5 mm.

The inorganic powder compact in the shape of a coating film (a coating film-shaped compact) may be produced, for example, in the following manner: organic substances, such as polyethylene glycol and/or ethyl cellulose, are mixed with an inorganic powder to produce a paste composition, the produced paste composition is applied to form a coating film and then calcined to decompose and remove the organic substances. The calcination here is preferably performed at 200° C. or higher.

The coating film-shaped compact may be formed on the surface of a metal filler, on the inner surface (wall surface) of a regeneration tower described later, on a narrow tube of a vapor heater, on a plate surface, and the like. When the coating film-shaped compact is formed on the surface of a metal filler, the filler can be used to fill a regeneration tower as is conventionally done or can be placed in a $CO_2$-containing absorbing solution reservoir at the bottom of a regeneration tower. The coating film-shaped compact may also be formed on the inner surface of a structure in which many flat plates are stacked leaving gaps that serve as flow paths for an absorbing material, or on the inner surface of a honeycomb (monolith) structure with many parallel through-holes. It is also possible to form these structures themselves from the inorganic powder compact.

CO₂ Desorption Device and Desorption Method of the Invention

The CO$_2$ desorption device and desorption method of the invention are described below. FIG. 1 is a schematic diagram roughly illustrating a CO$_2$ desorption device according to one embodiment of the invention. FIG. 2 is a schematic diagram roughly illustrating the inside of the regeneration tower of FIG. 1.

As shown in FIG. 1, the CO$_2$ desorption device of the invention includes a CO$_2$ absorption tower for absorbing and removing CO$_2$ by using an absorbing solution (hereinafter simply referred to as "absorption tower") and a regeneration tower for regenerating the absorbing solution containing absorbed CO$_2$. In an exhaust gas introduction area, an exhaust gas cooling unit and an exhaust gas cooler for cooling exhaust gas, an exhaust gas blower for pressurizing exhaust gas, and the absorption tower filled with the CO$_2$ absorbing solution for absorbing and removing CO$_2$ from exhaust gas, are arranged. In this application, an absorbing solution containing absorbed CO$_2$ is referred to as a CO$_2$-containing absorbing solution (or a CO$_2$-containing solution), and an absorbing solution not containing absorbed CO$_2$ or an absorbing solution regenerated in the regeneration tower is referred to as an unabsorbed solution. In this application, the CO$_2$-containing absorbing solution and the unabsorbed solution are distinguished from each other.

The solution used for absorbing CO$_2$ (unabsorbed solution) is not particularly limited. For example, an aqueous solution of one or more alkanolamines, such as monoethanolamine, diethanolamine, triethanolamine, methyldiethanolamine, diisopropanolamine, and diglycolamine, in water is suitably used. These alkanolamines may be used singly or in a combination of two or more.

The absorption tower and the regeneration tower are connected by a line for supplying the CO$_2$-containing absorbing solution to the regeneration tower and a line for supplying the regenerated unabsorbed solution to the absorption tower. These two lines are provided with a heat exchanger for exchanging heat between the CO$_2$-containing absorbing solution and the unabsorbed solution. Between the heat exchanger and the absorption tower in the line for supplying the unabsorbed solution to the absorption tower, a cooler for further cooling the unabsorbed solution is provided.

As shown in FIG. 2, the regeneration tower is provided with a nozzle for downwardly spraying the CO$_2$-containing absorbing solution supplied from the line. Below the nozzle, a filled portion filled with the catalyst of the invention is provided.

At the bottom of the regeneration tower, a heater for heating the CO$_2$-containing absorbing solution is provided. The heater and the regeneration tower are connected by a line so that the CO$_2$-containing absorbing solution accumulated in the bottom of the tower is returned to the bottom of the tower after being heated by the heater.

At the CO$_2$ gas outlet side at the top of the regeneration tower, a line is provided, in which a cooler for cooling CO$_2$ gas and a separator for separating moisture from CO$_2$ gas are sequentially arranged. The separator is provided with a line for resupplying water separated by the separator to the top of the regeneration tower. This line is provided with a nozzle for downwardly spraying this reflux water.

Next, a CO$_2$ desorption method is described below. CO$_2$-containing exhaust gas discharged from a boiler is first transferred to the cooling unit to be cooled with cooling water. The cooled exhaust gas is pressurized by the blower, and then transferred to the absorption tower.

In the absorption tower, exhaust gas is brought into countercurrent contact with an unabsorbed solution mainly containing alkanolamine, and as a result of the chemical reaction, CO$_2$ in the exhaust gas is absorbed into the unabsorbed solution. The exhaust gas from which CO$_2$ was removed is discharged out of the system from the top of the tower. The absorbing solution containing absorbed CO$_2$ is pressurized with a pump, heated by the heat exchanger, and supplied to the regeneration tower via the line from the bottom of the tower.

In the regeneration tower, the CO$_2$-containing absorbing solution is sprayed from the nozzle and flows down through the surface of the catalyst of the invention. At this time, the absorbing solution is heated by high-temperature water vapor coming upward from below (described later), causing partial desorption of CO$_2$. The use of the catalyst of the invention in this desorption reaction better promotes desorption, compared to known metal fillers. The CO$_2$-containing absorbing solution that has passed through the filled portion accumulates at the bottom of the tower. The accumulated CO$_2$-containing absorbing solution is extracted through the line and heated by the heater, causing partial desorption of CO$_2$ with the generation of high-temperature water vapor. Here, CO$_2$ desorption can be promoted with the application of the catalyst of the invention to the surface of the heater. The desorbed CO$_2$ and the high-temperature water vapor move upward inside the tower while the not evaporated CO$_2$-containing absorbing solution moves downward to be accumulated again. As described above, the high-temperature water vapor that moves upward inside the tower heats the CO$_2$-containing absorbing solution that is flowing down through the surface of the catalyst of the invention. The CO$_2$ and water vapor discharged from the top of the regeneration tower are cooled by the cooler so that the moisture is condensed. The condensed moisture is separated by the separator and returned to the regeneration tower. The high-purity CO$_2$ free from moisture is discharged out of this CO$_2$ desorption device, so as to be effectively used for other purposes.

As described above, the inorganic powder or inorganic powder compact having a BET specific surface area of 7 m$^2$/g or more can efficiently desorb CO$_2$ from a CO$_2$-containing solution.

Advantageous Effects of Invention

The catalyst of the invention comprises an inorganic powder or inorganic powder compact having a BET specific surface area of 7 m$^2$/g or more, and thus has an excellent activity to desorb CO$_2$ from a CO$_2$-containing absorbing solution. Therefore, the inorganic powder or inorganic powder compact can be suitably used as a catalyst for desorbing CO$_2$ from a CO$_2$-containing solution.

Figure 1:
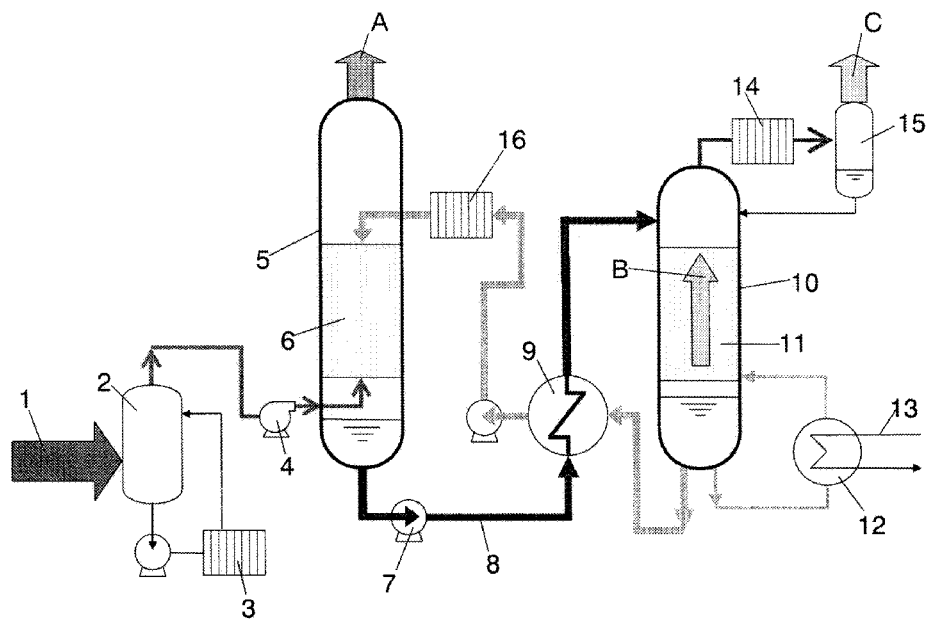
FIG. 1 is a schematic diagram roughly illustrating a CO$_2$ desorption device according to one embodiment of the invention. The arrow A in FIG. 1 indicates a movement of exhaust gas free from CO$_2$ towards a flue. The arrow B in FIG. 1 indicates that CO$_2$ is separated from the absorbing solution. The arrow C in FIG. 1 indicates that CO$_2$ is collected.
Figure 2:
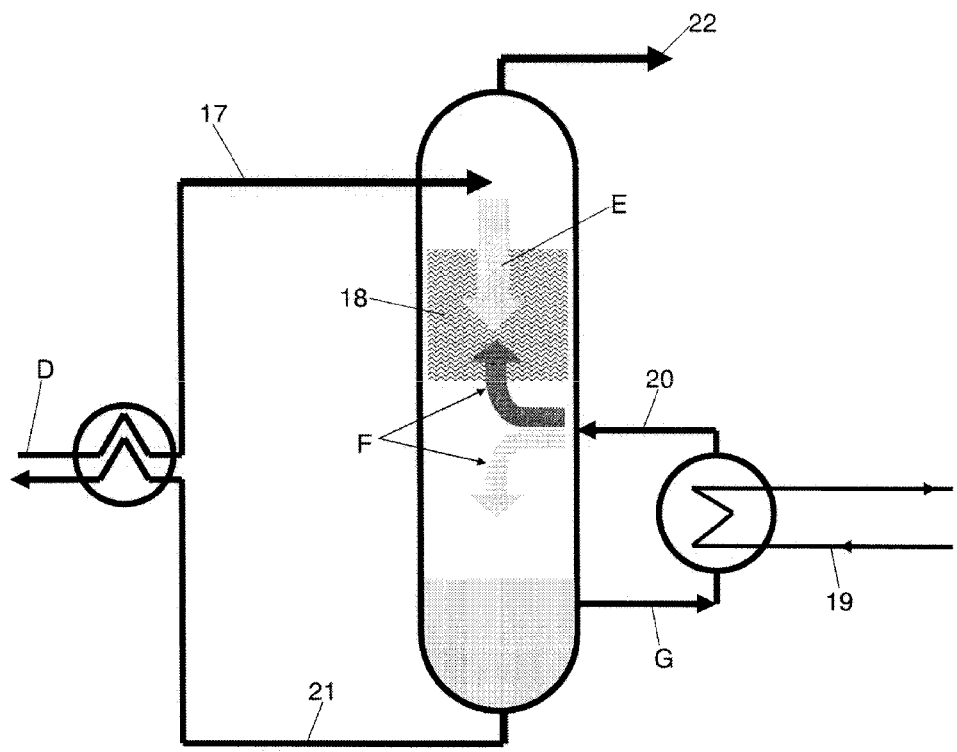
FIG. 2 is a schematic diagram roughly illustrating the inside of the regeneration tower of FIG. 1. The arrow D in FIG. 2 indicates that a CO$_2$-containing absorbing solution is transferred from the absorption tower. The arrow E in FIG.

2 indicates that the $CO_2$-containing absorbing solution transferred from the absorption tower moves down through the surface of the $CO_2$ desorption catalyst of the invention while allowing desorption of $CO_2$ under the heat of high-temperature water vapor. The arrows F in FIG. 2 indicate upward movement of the high-temperature water vapor and $CO_2$, and downward movement of the not evaporated absorbing solution. The arrow G in FIG. 2 indicates that the absorbing solution is partially extracted to be heated by the heater (high-temperature water vapor is generated when the absorbing solution is heated by the heater).

DESCRIPTION OF EMBODIMENTS

The invention is described in further detail below with reference to Examples. However, the scope of the invention is not limited to these Examples.

Example 1

15 mg of a BN powder (produced by Sigma-Aldrich) was pressed into a disk shape having a diameter of about 5 mm to produce the inorganic powder compact (catalyst) (metals unsupported) of Example 1. Based on the size of this compact, the external surface area was calculated to be 0.55 $cm^2$. Hereinafter, this simple external surface area of the external surface of the compact is referred to as the "apparent surface area."

Example 2

An aqueous solution was prepared by dissolving gallium nitrate n-hydrate (Ga=18.9%) (Mitsuwa Chemistry Co., Ltd.) and aluminum nitrate nonahydrate (Nacalai Tesque, Inc.) in 100 mL of water, in such a manner that Ga/(Ga+Al)=0.5. Next, ammonium carbonate (5-fold equivalent) (the "equivalent" as used herein is based on the total molar numbers of Ga ions and Al ions) was added at once to the aqueous solution above, and stirred for 1 hour with a stirrer. The produced precipitate was washed several times with water and collected, followed by calcination at 700° C. in air to obtain $Ga_2O_3$—$Al_2O_3$. Subsequently, 15 mg of the BN powder used in Example 1 and 15 mg of this $Ga_2O_3$—$Al_2O_3$ were thoroughly mixed and pressed into a disk shape as in Example 1 to thereby produce the inorganic powder compact of Example 2.

Examples 3 to 14

Each metal salt powder was dissolved in water to produce each metal salt aqueous solution. Each metal salt aqueous solution was impregnated onto an $Al_2O_3$ powder (Sumitomo Chemical Co., Ltd., product name: AKP-G05) or onto an $SiO_2$ powder (Fuji Silysia Chemical Ltd., product name: CARiACT G-10), in such a manner that the weight of each metal after reduction treatment was 2 wt %, followed by drying in air at 100° C. for 6 hours and then calcination in air at 400° C. for 30 minutes to thereby obtain various inorganic powders (produced by an impregnation method). Each metal salt powder used herein is shown below.
Metal Salt Powders
- Pd salt: a palladium nitrate n-hydrate ($Pd(NO_3)_2.nH_2O$) powder, produced by Kishida Chemical Co., Ltd.)
- Fe salt: an iron nitrate nonahydrate ($Fe(NO_3)_3.9H_2O$) powder, produced by Sigma-Aldrich
- Co salt: a cobalt nitrate hexahydrate ($Co(NO_3)_2.6H_2O$) powder, produced by Sigma-Aldrich
- Ag salt: a silver nitrate ($AgNO_3$) powder, produced by Sigma-Aldrich
- Ni salt: a nickel nitrate hexahydrate ($Ni(NO_3)_2.6H_2O$) powder, produced by Kanto Chemical Co., Inc.
- Pt salt: a diammine dinitro platinum ($Pt(NH_3)_2(NO_2)_2$) powder, produced by Kojima Chemicals Co., Ltd.

15 mg of the BN powder used in Example 1 and 15 mg of each of these various inorganic powders obtained by the impregnation method above were thoroughly mixed, and pressed into a disk shape as in Example 1. A heat treatment was further performed at 300 to 400° C. in 1% $H_2$—$N_2$ gas for 2 hours to thereby produce the inorganic powder compacts of Examples 3 to 14.

Example 15

2.5 mol of sodium carbonate was dissolved in 2 L of water and kept warm at 60° C. This aqueous alkaline solution was used as Solution A. 0.15 mol of zinc nitrate, 0.015 mol of aluminum nitrate, 0.012 mol of gallium nitrate, and 0.003 mol of magnesium nitrate were dissolved in 600 mL of water, and kept warm at 60° C. This acidic solution was used as Solution B. 0.3 mol of copper nitrate was dissolved in 300 mL of water and kept warm at 60° C. This acidic solution was used as Solution C. First, Solution B was uniformly added to Solution A dropwise over 30 minutes while being stirred to obtain a suspension. Next, Solution C was added to this suspension dropwise over 30 minutes at a constant rate to obtain a precipitate. After completion of the dropwise addition, aging was performed for 2 hours. Next, the precipitate was filtered and washed to the extent that neither sodium ions nor nitrate ions were detected. Further, the resulting product was dried at 100° C. for 24 hours and then calcined at 300° C. for 3 hours to produce a cylindrical compact of a composite oxide (CuO—ZnO—$Al_2O_3$—$Ga_2O_3$—MgO; metal molar ratio: Cu:Zn:Al:Ga:Mg=100:50:5:4:1). A portion of this cylindrical compact was chipped off to give 15 mg of a spherical compact, which was subjected to heat treatment at 300 to 400° C. in 1% $H_2$—$N_2$ gas for 2 hours to produce the inorganic powder compact of Example 15.

Example 16

A portion of Cr-based catalyst (Sud-Chemie Catalyst Co., Ltd., product name: ActiSorb 410RS) was chipped off to give 15 mg of a spherical inorganic powder, which was subjected to heat treatment at 300 to 400° C. in 1% $H_2$—$N_2$ gas for 2 hours to produce the inorganic powder compact of Example 16.

Example 17

660 mg of Zeolite (produced by Tosoh Corporation, product name: HSZ-640 HOD1A; BET specific surface area catalog value: 400 $m^2/g$; diameter: about 1.5 mm; length: about 6 mm; extruded shape) was prepared.

Example 18

660 mg of spherical $Al_2O_3$ (produced by Sumitomo Chemical Co., Ltd., product name: KHA-46; BET specific surface area catalog value: 150 $m^2/g$) was prepared. Specifically, six spherical $Al_2O_3$ articles (110 mg each) each having a diameter of about 5 mm were prepared.

Comparative Example 1

Conventionally used metal filler (100 mg) was prepared. Specifically, one metal filler (100 mg) was prepared by wadding a stainless steel mesh with a width of 6 mm and a length of 30 mm into a ball having a diameter of 6 mm.

Comparative Example 2

Conventionally used metal filler (660 mg) was prepared. Specifically, seven fillers in total were prepared: six metal fillers (100 mg each) used in Comparative Example 1; and one metal filler (60 mg) obtained by wadding a stainless steel mesh with a width of 6 mm and a length of 18 mm into a ball having a diameter of 6 mm.

Test Example 1: Surface Area Measurement

The apparent surface area of each catalyst obtained in Examples 1 to 16 and Comparative Examples 1 to 2 (inorganic powder compacts, fillers, etc.) was calculated, and the BET specific surface area was measured.

The apparent surface area was calculated based on the size and shape of each catalyst. The apparent surface area of each metal filler of Comparative Examples 1 and 2 was calculated based on the diameter, length, and number of stainless steel wires used to form the mesh. The BET specific surface area was obtained using the NOVA-4200e produced by Quantachrome. Tables 1 and 2 below show the measurement results.

Test Example 2: Measurement of $CO_2$ Amount Present in Test Liquid and Calculation of Desorption Amount Per Apparent Surface Area 30 wt % of aqueous monoethanolamine (MEA) solution (50 mL) containing absorbed $CO_2$ (123.4 or 127.1 g-$CO_2$/L) was placed into a volumetric flask, to which one of each of the catalysts obtained in Examples 1 to 16 and Comparative Example 1 was added. The aqueous MEA solution was then heated. The heating was performed using a silicone oil bath. The temperature was increased at a rate of 1.4° C./min. After the temperature of the aqueous MEA solution reached 104° C. and was maintained at 104° C. for 30 minutes, a small amount of the aqueous MEA solution was sampled to measure the amount of residual $CO_2$. Based on the measured amount of residual $CO_2$, the $CO_2$ desorption amount per apparent surface area was calculated. The $CO_2$ desorption amount per apparent surface area was obtained by subtracting the amount of residual $CO_2$ after the temperature reached 104° C. and was maintained at this temperature for 30 minutes from the $CO_2$ amount before the test, and dividing the result by the apparent surface area. Table 1 shows the test results.

Test Example 3: Calculation of Desorption Rate of $CO_2$ Present in Test Liquid and Desorption Rate of $CO_2$ Per Apparent Surface Area An aqueous amine solution (150 mL) containing absorbed $CO_2$ (151.6 g-$CO_2$/L) was placed into a flask, to which one of each of the catalysts obtained in Examples 17 and 18 and Comparative Example 2 was added. This absorbing solution was heated to 75° C. The heating was performed by immersing the flask in a silicone oil bath heated to 120° C. The flow rate of desorbed $CO_2$ when the absorbing solution had a temperature of 75° C. was measured using a mass flow meter (Azbil Corporation, MQV0002). Table 2 shows the test results.

Consideration 1:

Referring to the results obtained in Test Example 2 in terms of the $CO_2$ desorption amount per apparent surface area obtained 30 minutes after the solution temperature reached 104° C., the use of the catalysts of Examples 1 to 16 resulted in much greater values, compared to the results of Comparative Example 1. This indicates that the $CO_2$ desorption activity of each catalyst (inorganic powder compact) of Examples 1 to 16 is far more excellent than that of metal filler. The use of a catalyst free from BN, such as the catalysts obtained in Examples 15 and 16, also resulted in a high $CO_2$ desorption amount per apparent surface area. Therefore, BN is not an essential component in the catalyst of the invention.

Consideration 2:

Referring to the results obtained in Test Example 3 in terms of the $CO_2$ desorption rate when the absorbing solution had a temperature of 75° C., the use of the catalysts of Examples 17 and 18 showed much higher values, compared to the results obtained with the use of the metal filler of Comparative Example 2. This indicates that the $CO_2$ desorption activity of each catalyst of Examples 17 and 18 is far more excellent than that of metal filler.

When each inorganic powder compact of Examples 1 to 18 is observed at the micro level, the surface thereof is not flat due to the presence of microscopic unevenness, pores, and the like, unlike metal filler. The presence of the microscopic unevenness, pores, and the like is assumed to be one of the reasons for the high $CO_2$ desorption activity. Considering this, high $CO_2$ desorption activity is achieved not only by the catalysts of Examples 1 to 16, but also by those having microscopic unevenness and pores to some extent. Among the catalysts of Examples 1 to 16, the compact of the BN powder used in Example 1 has the smallest BET surface area of 7 m²/g. A catalyst having a BET specific surface area equal to or higher than this value is therefore expected to achieve an effect similar to the above.

TABLE 1

| | Weight and surface area of test catalyst | | | | $CO_2$ amount in test liquid (g-$CO_2$/L) | | Desorption amount per apparent surface area 30 min after the temp. reached 104° C. (g-$CO_2$/cm²) |
|---|---|---|---|---|---|---|---|
| | Catalyst other than BN (mg) | BN (mg) | Apparent surface area (cm²) | BET specific surface area (m²/g) | Before test | 30 min after the temp. reached 104° C. | |
| Ex. 1 | BN | 0 | 15 | 0.55 | 7 | 127.1 | 31.3 | 174 |
| Ex. 2 | BN + $Ga_2O_3$—$Al_2O_3$-based catalyst | 15 | 15 | 0.46 | 78 | 123.4 | 29.9 | 203 |
| Ex. 3 | BN + Pd/$Al_2O_3$ catalyst | 15 | 15 | 0.48 | 80 | 123.4 | 31.7 | 191 |
| Ex. 4 | BN + Fe/$Al_2O_3$ catalyst | 15 | 15 | 0.49 | 73 | 123.4 | 32.9 | 185 |
| Ex. 5 | BN + Pd/$SiO_2$ catalyst | 15 | 15 | 0.51 | 113 | 123.4 | 34.6 | 174 |

TABLE 1-continued

| | | Weight and surface area of test catalyst | | | $CO_2$ amount in test liquid (g-$CO_2$/L) | | Desorption amount per |
|---|---|---|---|---|---|---|---|
| | | Catalyst other than BN (mg) | BN (mg) | Apparent surface area (cm$^2$) | BET specific surface area (m$^2$/g) | Before test | 30 min after the temp. reached 104° C. | apparent surface area 30 min after the temp. reached 104° C. (g-$CO_2$/cm$^2$) |

| | | Catalyst other than BN (mg) | BN (mg) | Apparent surface area (cm$^2$) | BET specific surface area (m$^2$/g) | Before test | 30 min after the temp. reached 104° C. | apparent surface area 30 min after the temp. reached 104° C. (g-$CO_2$/cm$^2$) |
|---|---|---|---|---|---|---|---|---|
| Ex. 6 | BN + Co/SiO$_2$ catalyst | 15 | 15 | 0.50 | 77 | 123.4 | 35.5 | 176 |
| Ex. 7 | BN + Fe/SiO$_2$ catalyst | 15 | 15 | 0.50 | 96 | 123.4 | 36.1 | 175 |
| Ex. 8 | BN + Co/Al$_2$O$_3$ catalyst | 15 | 15 | 0.49 | 74 | 123.4 | 36.2 | 178 |
| Ex. 9 | BN + Ag/Al$_2$O$_3$ catalyst | 15 | 15 | 0.48 | 68 | 123.4 | 36.8 | 180 |
| Ex. 10 | BN + Ag/SiO$_2$ catalyst | 15 | 15 | 0.51 | 89 | 123.4 | 37.1 | 169 |
| Ex. 11 | BN + Ni/Al$_2$O$_3$ catalyst | 15 | 15 | 0.49 | 77 | 123.4 | 37.3 | 176 |
| Ex. 12 | BN + Pt/SiO$_2$ catalyst | 15 | 15 | 0.51 | 112 | 123.4 | 37.8 | 168 |
| Ex. 13 | BN + Pt/Al$_2$O$_3$ catalyst | 15 | 15 | 0.49 | 71 | 123.4 | 40.2 | 170 |
| Ex. 14 | BN + Ni/SiO$_2$ catalyst | 15 | 15 | 0.50 | 70 | 123.4 | 40.4 | 166 |
| Ex. 15 | CuO—ZnO-based catalyst | 15 | 0 | 0.24 | 63 | 123.4 | 34.6 | 370 |
| Ex. 16 | Cr-based catalyst | 15 | 0 | 0.43 | 245 | 123.4 | 37.5 | 200 |
| Comp. Ex. 1 | Metal filler | 100 | 0 | 3.4 | <3 (less than 3) | 123.4 | 40.2 | 24 |

TABLE 2

| | | Weight and surface area of test catalyst | | | $CO_2$ desorption rate when absorbing solution is at 75° C. | |
|---|---|---|---|---|---|---|
| | | Weight (mg) | Apparent surface area (cm$^2$) | BET specific surface area (m$^2$/g) | $CO_2$ desorption rate (mL/min) | $CO_2$ desorption rate per apparent surface area (mL/min·cm$^2$) |
| Ex. 17 | Zeolite catalyst | 660 | 21 | 400 | 473 | 23 |
| Ex. 18 | Al$_2$O$_3$ catalyst | 660 | 4.7 | 150 | 419 | 89 |
| Comp. Ex. 2 | Metal filler | 660 | 22 | <3 (less than 3) | 144 | 7 |

EXPLANATION OF REFERENCE NUMERALS

1. Exhaust Gas
2. Exhaust Gas Cooling Tower
3. Exhaust Gas Cooler
4. Exhaust Gas Blower
5. Absorption Tower
6. Filler
7. Extraction Pump
8. $CO_2$-containing Absorbing Solution
9. Heat Exchanger
10. Regeneration Tower
11. Filler
12. Heater
13. Heated Vapor (High-temperature Water Vapor)
14. Cooler
15. $CO_2$ Separator
16. Cooler
17. $CO_2$-containing Absorbing Solution
18. $CO_2$ Desorption Catalyst of the Invention
19. Heated Water Vapor (High-temperature Water Vapor)
20. Mixture of High-temperature Absorbing Solution, Water Vapor, and $CO_2$
21. Unabsorbed Solution after $CO_2$ has been desorbed therefrom
22. Mixture of $CO_2$ Gas and Water Vapor

The invention claimed is:

1. A $CO_2$ desorption device including:
   a $CO_2$ absorption tower for absorbing and removing $CO_2$ from exhaust gas by using an absorbing solution; and
   a regeneration tower for regenerating the absorbing solution containing absorbed $CO_2$,
   wherein the regeneration tower contains a $CO_2$ desorption catalyst comprising an inorganic powder or inorganic powder compact,
   wherein the inorganic powder or inorganic powder compact has a BET specific surface area of 7 m$^2$/g or more,
   wherein the inorganic powder or inorganic powder compact is at least one member selected from the group consisting of Al$_2$O$_3$ and zeolites, and
   wherein at least one metal selected from the group consisting of Pd, Fe, Co, Ag, Ni, and Pt is supported on the catalyst.

2. The $CO_2$ desorption device according to claim 1, wherein the inorganic powder or inorganic powder compact further comprises BN.

3. A method for desorbing $CO_2$,
   the method comprising the step of regenerating an absorbing solution containing absorbed $CO_2$,
   wherein the regeneration step brings the absorbing solution containing absorbed $CO_2$ into contact with a $CO_2$ desorption catalyst comprising an inorganic powder or inorganic powder compact,
   wherein the inorganic powder or inorganic powder compact has a BET specific surface area of 7 m$^2$/g or more,
   wherein the inorganic powder or inorganic powder compact is at least one member selected from the group consisting of Al$_2$O$_3$ and zeolites, and
   wherein at least one metal selected from the group consisting of Pd, Fe, Co, Ag, Ni, and Pt is supported on the catalyst.

4. The method for desorbing $CO_2$ according to claim 3, wherein the inorganic powder or inorganic powder compact further comprises BN.

* * * * *